United States Patent [19]
Martinelli et al.

[11] Patent Number: 6,105,096
[45] Date of Patent: Aug. 15, 2000

[54] COMPUTER COMMUNICATION USING FIBER-OPTIC CABLE

[75] Inventors: RenéMartinelli, Eybens; Gregory Mathes, Voreppe, both of France

[73] Assignee: Hewlett-Packard Company, Palo Alto, Calif.

[21] Appl. No.: 08/891,696

[22] Filed: Jul. 11, 1997

[30] Foreign Application Priority Data

Jul. 25, 1996 [EP] European Pat. Off. ............. 96410081

[51] Int. Cl.⁷ .................................................. G06F 13/40
[52] U.S. Cl. ......................... 710/129; 710/126; 709/250
[58] Field of Search ........................ 395/200.47–200.49, 395/200.8, 250.01–250.08, 280–286, 306–309

[56] References Cited

U.S. PATENT DOCUMENTS

| | | |
|---|---|---|
| 4,063,230 | 12/1977 | Metcalfe . |
| 4,099,024 | 7/1978 | Boggs . |
| 4,399,563 | 8/1983 | Greenberg . |
| 4,531,238 | 7/1985 | Rawson . |
| 4,756,593 | 7/1988 | Koakutsu . |
| 4,999,794 | 3/1991 | Yakushiji . |
| 5,005,937 | 4/1991 | Aida et al. ............................ 350/96.16 |
| 5,237,659 | 8/1993 | Takats . |
| 5,237,698 | 8/1993 | Ohmae . |
| 5,251,203 | 10/1993 | Thompson . |
| 5,384,721 | 1/1995 | Joto . |
| 5,457,801 | 10/1995 | Aihara . |
| 5,590,285 | 12/1996 | Krause et al. ......................... 395/200.2 |
| 5,594,576 | 1/1997 | Sutherland et al. .................... 359/118 |
| 5,689,715 | 11/1997 | Crump et al. .......................... 395/750 |
| 5,745,733 | 4/1998 | Robinson ................................ 395/500 |

FOREIGN PATENT DOCUMENTS

| | | |
|---|---|---|
| 0230351 | 7/1987 | European Pat. Off. . |
| 0 448 989 | 10/1991 | European Pat. Off. . |
| 0567957 | 11/1993 | European Pat. Off. . |
| 0 595 450 | 5/1994 | European Pat. Off. . |
| 0 701 196 | 3/1996 | European Pat. Off. . |
| 2 723 220 | 2/1996 | France . |
| WO 94/13072 | 6/1994 | WIPO . |

OTHER PUBLICATIONS

Microsoft Press Computer Dictionary, Second Edition, pp, 231–232, 1994.

AMD. *White Paper* "Magic Packet Technology" Pub.#20213, Issue Date: Nov. 1995.

AMD. *Application Note* "Magic Packet Technology Application in Hardware and Software" Pub.#20381, Issue Date: Mar. 1996.

*Primary Examiner*—Ayaz R. Sheikh
*Assistant Examiner*—Jigar Pancholi

[57] ABSTRACT

A simple connection arrangement is provided for intercommunicating a portable computer and a desktop computer. Each computer is provided with a 2:1 optical coupler for transmitting and receiving signals to/from a duplex fiber-optic cable used to interconnect the computers. The cable is unpluggable at one or both ends and avoids crossover problems. A standard protocol can be operated across the link established by the fiber-optic cable. The desktop computer preferably includes functionality enabling communication to be extended into a connected computer network.

28 Claims, 4 Drawing Sheets

COMPUTER COMMUNICATION USING FIBER-OPTIC CABLE

FIELD OF THE INVENTION

The present invention relates to computer communication using fiber-optic cable and, in particular, but not exclusively, to communications between a portable computer and a desktop computer over a fiber-optic cable.

BACKGROUND OF THE INVENTION

Users of portable computers, such as frequent travellers, generally also have a desktop computer back at their office or home and the need often arises to exchange data electronically back and forth between the portable and desktop computers. Traditionally, there are a number of ways this can be achieved. For example, the user could copy data from one computer onto a floppy disc, transfer this disc to the other computer, and then read in the data, always assuming that both computers have compatible floppy disc drives. The foregoing approach is obviously very inconvenient and a much more common approach, illustrated in FIG. 1 of the accompanying drawings, is to interconnect the portable and desktop computers 10, 11 through their serial or parallel ports using a suitable cable 12. Appropriate software running on both computers is then used to effect the desired data transfer. The drawback of this approach is that with current standard serial and parallel port designs, the data transfer rates are low and the mechanics of making the connection are cumbersome (the cables and cable connectors required being relatively substantial and the mating connectors provided on the computers being invariably located in inconvenient positions since for most usages, they are only infrequently accessed).

Another approach to providing inter-connection between a portable and a desktop computer is to use a "docking station" providing a relatively direct connection between the bus systems of the two computers; this generally enhances the data transfer rates achievable but at a significant cost premium in providing the docking station.

Figures 1, 2, 3:
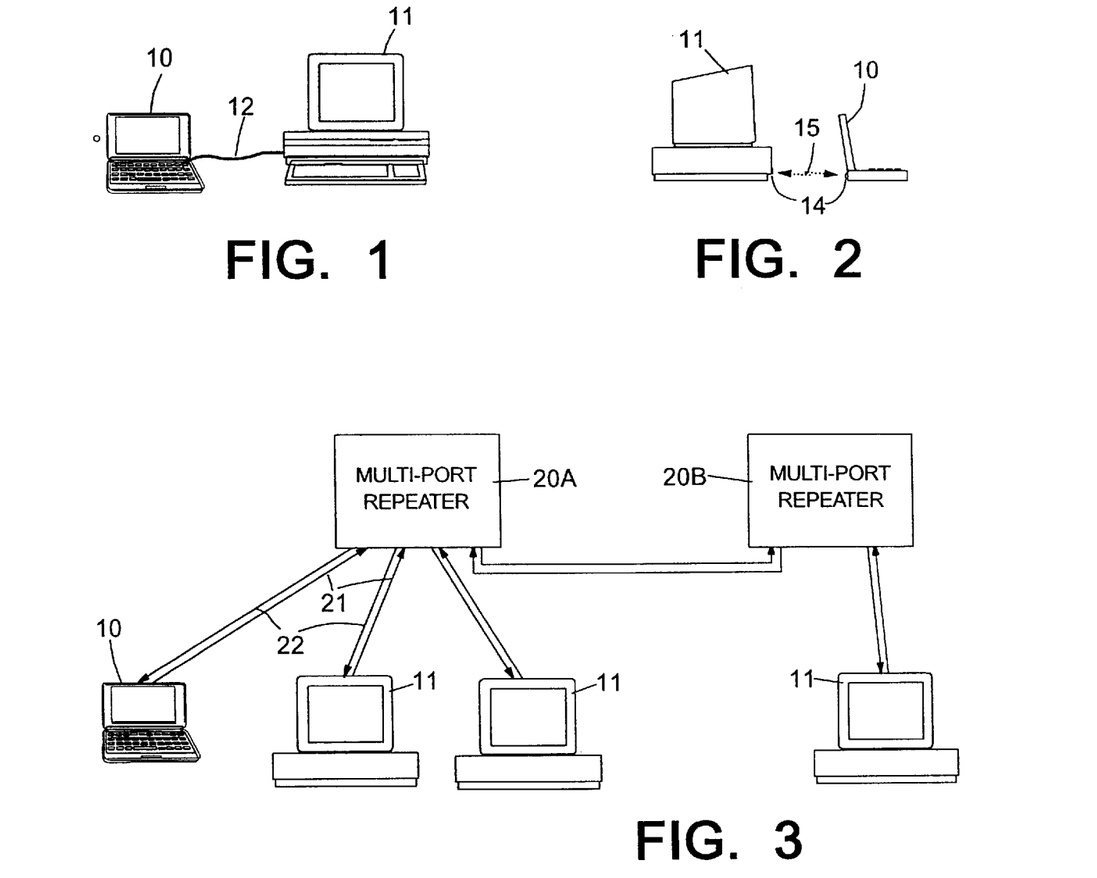
FIG. 1 is a diagram of a prior art arrangement for inter-communicating a portable computer with a desktop computer through a serial or parallel cable.
FIG. 2 is a diagram of a prior art arrangement for inter-communicating a portable computer with a desktop computer through an infrared link.
FIG. 3 is a diagram of a prior art arrangement for inter-communicating a portable computer with a desktop computer through a standard 10BaseT network.

A further possibility is to use an infrared link between the two computers as illustrated in FIG. 2; in this case, both the portable computer 10 and the desktop computer 11 are provided with infrared transceivers 14 which when lined up with each other enable an infrared link 15 to be established giving high data transfer rates. This approach has in practice been found to be very sensitive to the correct alignment of the transceivers and cannot currently be considered a robust solution.

Yet another approach is to use a computer network to interconnect the portable and desktop computers. FIG. 3 illustrates one possible arrangement based on a 10BaseT network (see ANSI/IEEE 802.3 standards). In this case, each computer or other DTE (in FIG. 3, portable 10, desktop computers 11) is connected by two UTP (Unshielded Twisted Pair) lines to a corresponding port of a multiport repeater unit 20A, 20B. One UTP line 21 serves to transmit signals from the DTE to the repeater unit and the other UTP line 22 serves to transmit signals from the repeater unit to the DTE. Signals received by the repeater unit at any port are repeated on the outgoing lines of all other ports. A repeater port may also be connected to a corresponding port of another repeater unit to enable expansion of the network. A fiber-optic version of this network arrangement is also known in which each UTP line is replaced by a corresponding fiber-optic cable providing a simplex connection.

Whilst the use of a network to exchange data between a portable and desktop computer provides reasonable data transfer rates (depending on the network technology used), a number of drawbacks still exist in relation to ease of use. In particular, because two UTP lines are used for each connection, care must be taken to ensure that the transmit output of the repeater unit is connected to the receive input of the DTE and that the transmit output of the DTE is connected to the receive input of the repeater unit—in other words, care must be taken to implement a "crossover" function somewhere along the path between the DTE and repeater unit. Unfortunately, a variety of practices exist with crossovers sometimes being built into the MAU (Media Attachment Unit) at each repeater port, sometimes being provided in the cable carrying the two UTP lines, and sometimes being built into the MAU at a DTE. As a result, it is very easy for a non-expert user to effect an improper connection unless the wiring has been previously set up taking into account whether or not the user's portable computer includes an internal crossover.

WO-94/13072 (Farallon Computing) describes one solution to the problem of correctly implementing crossover in a 10BaseT type network. More particularly, an auto-crossover transceiver is described that is capable of sensing which line is a transmit line and which a receive line and correctly interconnecting the lines presented to it. The auto-crossover transceiver is described in the context of a form of 10BaseT type network (see FIG. 4) in which the repeater unit is effectively distributed over the network between a series of auto-crossover transceivers 25 in a way that allows daisy-chaining of the DTEs (in this case, computers 10 and 11A,B,C). Each transceiver is associated with a DTE and receives power from it when the DTE is switched on. When energised, the transceiver operates as a three port repeater, both transferring signals along the daisy-chain of transceivers and exchanging signals with its associated DTE over cable 27 that typically connects to the serial port of the DTE. Each transceiver includes bypass relays which maintain the daisy chain when the corresponding DTE is turned off resulting in de-energisation of the repeater circuitry of the transceiver.

Figure 4:
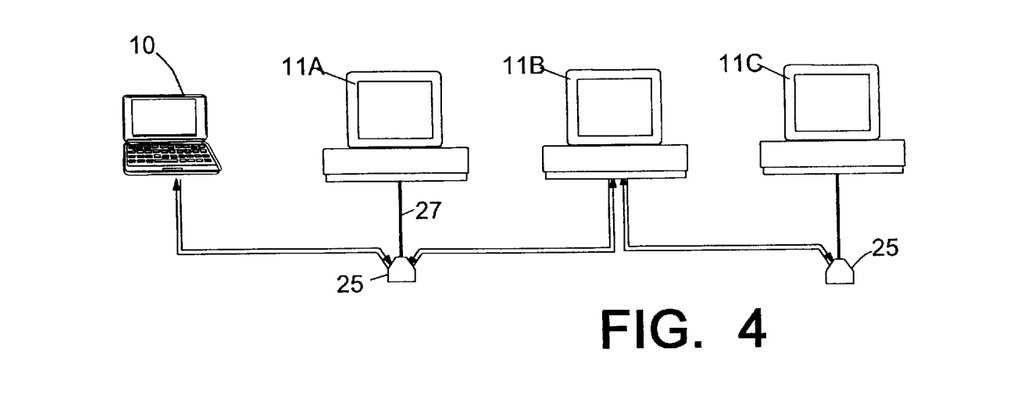
FIG. 4 is a diagram of a prior art arrangement for inter-communicating a portable computer with a desktop computer through a 10BaseT type network using a daisy chain of auto-crossover transceivers.

The transceiver 25 can be implemented either as a separate unit (as illustrated in FIG. 4 for computers 11A and 11C), or as a card insertable in a desktop computer (as for computer 11B).

It will be appreciated that with the arrangement described in WO-94/13072, it is a much simpler matter for the user of a portable computer to connect up the portable computer 10 to the network in order to exchange data with a desktop computer 11 (in FIG. 4, the portable computer 10 is shown attached at the end of the daisy chain, depending from the repeater 25 associated with computer 11A). However, whilst the provision of auto-crossover circuitry in the transceivers 25 facilitates use, it represents a cost overhead and even then does not completely obviate the need for crossover cables in certain circumstances.

There thus remains a need for a simple way for a non-expert to interconnect a portable computer with a desktop computer which is capable of supporting high data transfer rates.

SUMMARY OF THE INVENTION

According to one aspect of the present invention, there is provided a communication system comprising a portable electronic apparatus provided with a first communications interface means, and a desktop computer provided with a second communications interface means, each said communications interface means comprising:

host interface means for interfacing the communications interface means with main processing functionality of the apparatus/computer concerned;

link interface means including:
a media attachment unit including an optical transmitter, an optical receiver, and a optical coupler, the optical coupler having a transmit port interfacing with the optical transmitter, a receive port interfacing with the optical receiver, and a bidirectional port optically coupled to both the transmit and receive ports, and optical connection means for connecting a duplex fiber-optic cable to said bidirectional port of the coupler; and interconnection means for operatively interconnecting said host interface means and said link interface means; the system further comprising a said duplex fiber-optic cable connected between said optical connection means of the said portable electronic apparatus and said desktop computer with the connection between the cable and at least one of said optical connection means being a releasable connection.

This system provides a very simple arrangement for inter-communicating the desktop computer and portable electronic apparatus as all that is required to make and unmake the connection in physical terms is the plugging and unplugging of a single fiber-optic cable, there being no crossover problems to overcome. Of course, optical couplers are themselves well know, but the use of such couplers in the manner proposed to simplify portable-to-computer connections has not been previously proposed.

Preferably, the second communications interface means further comprises network interface means for interfacing the desktop computer with a computer network, said interconnection means of the second communications interface means being operative to permit the portable computer to communicate through the link interface means of said second communications interface means selectiveley with:

said main processing functionality of the desktop computer through said host interface means of the second communications interface means, and said computer network through said network interface means of the second communications interface means.

Preferably, the desktop computer has a power provisioning system for powering the computer from an external power source, the power provisioning system having first and second states and comprising:

user-operable power state control means for transitioning the power provisioning system between its first and second states, a main power supply for energising the desktop computer when the power provisioning system is in its first state and is connected to the external power source, and a standby power supply for energising the link interface means, the interconnection means and the network interface means of the desktop computer when the power provisioning system is in its second state and is connected to external power source.

With this arrangement, even when the desktop computer is switched "off" by the user, the standby power supply still energises the components needed for communication with the network; as a result, the portable electronic apparatus can still connect with the network through the desktop computer.

According to another aspect of the present invention, there is provided portable electronic apparatus provided with a communications interface housed within the electronic apparatus and comprising:

host interface means for interfacing the communications interface with main processing functionality of the portable electronic apparatus;

link interface means including:
a media attachment unit including an optical transmitter, an optical receiver, and a optical coupler, the optical coupler having a transmit port interfacing with the optical transmitter, a receive port interfacing with the optical receiver, and a bidirectional port optically coupled to both the transmit and receive ports, and optical connection means for connecting a duplex fiber-optic cable to said bidirectional port of the coupler; and interconnection means for operatively interconnecting said host interface means and said link interface means.

In one embodiment, the optical connection means is an externally-accessible pluggable optical connector for releasably engaging with the fiber-optic cable. In another embodiment, the fiber-optic cable has a first end connected to the bidirectional port of the optical coupler by the optical connector means, and a second end provided with a pluggable optical connector; in this case, the portable electronic apparatus can advantageously be provided with an internal cable store from which the fiber-optic cable can be drawn out for connection to other apparatus. The interconnection means of the portable electronic apparatus may be no more than a direct physical or logical connection without added functionality.

The communications interface may be provided on the main circuit board of the portable electronic apparatus. Alternatively, as many portable electronic apparatus are nowadays provided with a PCMCIA slot, the communications interface can be provided on a PCMCIA module engaged in the PCMCIA slot of the portable apparatus. Other forms of plug-in module are also possible.

Thus, according to a further aspect of the present invention, there is provided a plug-in module for electronic apparatus, the module comprising:

host interface means for interfacing the module with said electronic apparatus;

link interface means including:
a media attachment unit including an optical transmitter, an optical receiver, and a optical coupler, the optical coupler having a transmit port interfacing with the optical transmitter, a receive port interfacing with the optical receiver, and a bidirectional port optically coupled to both the transmit and receive ports, and optical connection means for connecting a duplex fiber-optic cable to said bidirectional port of the coupler; and interconnection means for operatively interconnecting said host interface means and said link interface means.

According to a still further aspect of the present invention, there is provided a desktop computer provided with communications interface means housed within the computer and comprising:

host interface means for interfacing the communications interface means with main processing functionality of said computer;

link interface means including:
a media attachment unit including an optical transmitter, an optical receiver, and a optical coupler, the optical coupler having a transmit port interfacing with the optical transmitter, a receive port interfacing with the optical receiver, and a bidirectional port optically coupled to both the transmit and receive ports, and optical connection means for connecting a duplex fiber-optic cable to said bidirectional port of the coupler; and interconnection means for operatively interconnecting said host interface means and said link interface means.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

Figure 5:
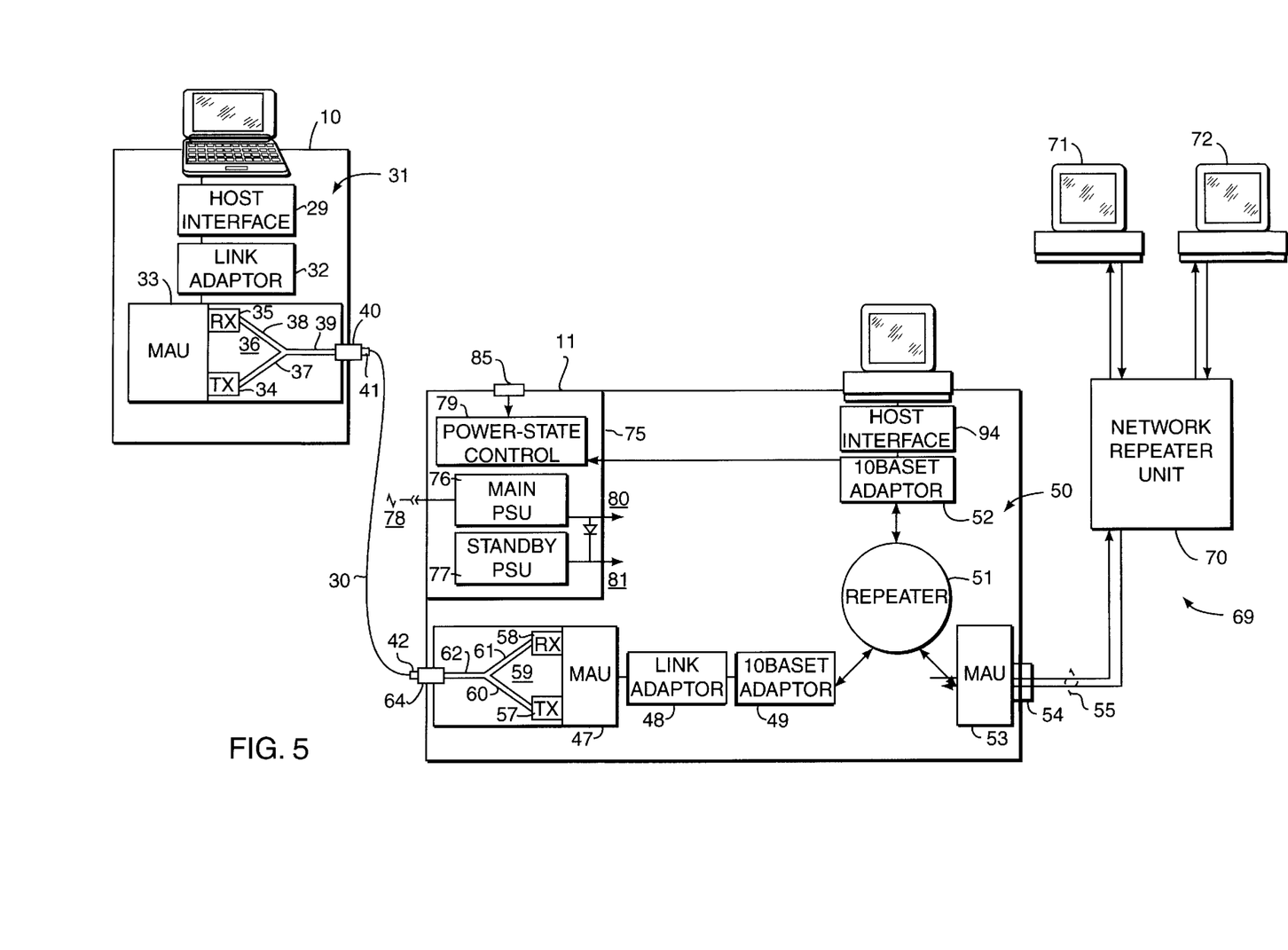
FIG. 5 is a diagram of a first embodiment of the invention for inter-communicating a portable computer with a desktop computer using a single fiber-optic cable.

FIG. 5 shows an embodiment of the present invention in which a portable computer 10 is connected to a desktop computer 11 through a link physically constituted by a single fiber-optic cable 30 providing duplex operation. In the following description only those portions of the computers 10, 11 relevant to the present invention are described.

The portable computer 10 includes a communications interface functional unit 31 housed within the computer 10. The interface unit 31 comprises a host interface 29 that provides an interface to the main processing circuits of computer 10 (such as its processor subsystem, not separately shown); a link adaptor 32 here directly connected to the host interface 29; a MAU 33 connected to the adaptor 32; and an externally-accessible connector 40. The MAU 33 includes an optical transmitter 34, an optical receiver 35, and an optical coupler 36 having first and second arms 37, 38 respectively interfacing with the optical transmitter and receiver 34, 35, and a leg 39 with which the arms 37, 38 unite. The connector 40 is a pluggable optical connector interfacing with the free end of the leg 39. A complementary optical connector 41 on one end of the cable 30 releasably engages in the connector 40.

The desktop computer 11 also includes a communications interface functional unit 50 housed within the computer 11. The interface unit 50 comprises a three-port repeater 51; a first 10BaseT adaptor 52 and host interface 94 that serve to interface the main processing circuits of computer 11 (such as its processor subsystem) with a first port of the repeater 51; a first MAU 53 connected to a second port of the repeater 51 and interfacing via connector 54 with a standard 10BaseT dual UTP cable 55 to provide network connectivity for the computer 11; and a link interface chain made up of a second 10BaseT adaptor 49 connected to the third port of the repeater 51, a link adaptor 48 and a link MAU 47, and an externally pluggable optical connector 64. The MAU 47 includes an optical transmitter 57, an optical receiver 58, and an optical coupler 59 having first and second arms 60, 61 respectively interfacing with the optical transmitter and receiver 57, 58, and a leg 62 with which the arms 60, 61 unite; the optical connector 64 interfaces with the free end of the leg 62. A complementary optical connector 42 on the corresponding end of cable 30 releasably engages in the connector 64.

With this arrangement, a link is provided by which data can be exchanged between the portable computer 10 and desktop computer 11 with the data passing to the main processing circuits of the computer 11 through the network adaptor 52 and host interface 94. The link between the computers 10 and 11 is effected according to the protocols run by the link adaptors 32, 48 with MAUs 33 and 47 adapting the link signals to the physical transmission medium, namely the duplex optical cable 30. The data flow between the link adaptor 48 and the main processing circuits of the computer 11 is achieved by using the network interface of the computer, link adaptor 48 being connected to the 10BaseT adaptor 49 which in turn connects to the repeater 51 and thus on through to the network adaptor 52 and host interface 94.

Physically setting up the connection between the computers 10 and 11 is very simple as it only requires the cable 30 to be plugged into connectors 40 and 64, there being no need to consider crossovers since the same cable carries the signals passing in both directions. By providing the optical coupler 36 and 59 as part of the communication interfaces 31 and 50 housed within the computers 10 and 11 respectively, a user is only presented with a single connector on each computer which makes the arrangement suitable for use even by novice users.

With the FIG. 5 arrangement, not only can the desktop computer 11 communicate through the adaptor 52, repeater 51 and MAU 53 with a network (in the present example, a standard 10BaseT network 69 represented by a repeater unit 70 and two DTEs 71, 72), but the portable computer 10 can also communicate with this network via cable 30, MAU 47, adaptors 48 and 49, repeater 51 and MAU 53. It will be noted that the communication of computer 10 with network 69 through interface 50 does not involve the main processing circuits of computer 11.

From one point of view, in the FIG. 5 embodiment the link made up of the adaptor 32, MAU 33, cable 30, MAU 47 and adaptor 48 serves to intercommunicate the network adaptor 49 of computer 11 with higher-level, generally software-based, communications functionality of computer 10 for the sending and receiving of messages by computer 10. The protocol run across this link must therefore be capable of exchanging service primitives between the higher-level communications functionality of computer 10 and the network adaptor 49. From another point of view, the adaptors 48 and 49 together serve as a protocol translator translating between the protocols used over the optical link and the network.

One important piece of information that needs to be passed over the link from computer 10 to the network adaptor 49 is the destination address of any message being sent by computer 10. Of course, the portable computer 10 in sending a message to any device connected to the network 69, including to the computer 11 (that is, to the adaptor 52 for access by the main processing circuits) could simply use the appropriate network address for the device concerned. This network address may be the actual hardware MAC address associated with the device (in the case of computer 11, this would be an address associated with adaptor 52) or a higher level address such as an IP address. Knowledge of the network address of computer 11 could be previously stored in computer 10 or downloaded from the communications interface 50 of computer 11 as part of an initialisation process executed when cable 30 is plugged in and both communication interfaces 31 and 50 energised.

However, as an alternative to the portable computer knowing the address of adaptor 52, the portable computer could simply mark each message intended for computer 11 with a predetermined indicator that would be the same for any computer 11 including a communications interface 50 of the FIG. 5 form. One possible form of this marking is a simple tag that would be recognised by the adaptor 48 or 49 and converted into the address of adaptor 52 before the adaptor 49 launched the message concerned towards repeater 51. Another possible way of marking a message for the adaptor 52 would be to use a fixed address that the adaptor 52 would always recognise as for itself (in addition to the address normally associated with the adaptor); in this case, in order to stop the message being received by other computers on network 69 that are of similar form to computer 11, either the repeater 51 or MAU 53 must be arranged to block transmission of the message concerned out onto the network 69 from computer 11.

As regards the sending of messages from the main processing circuits of computer 11 through the interface 94 and adaptor 52 to the computer 10, the network adaptor 49 will generally have its own MAC address that it will include in messages it sends out through repeater 51, this address then being used for return messages. An alternative to using a MAC address preassigned to adaptor 49, is for the portable to have its own preassigned MAC address which it downloads to network adaptor 49 for use by the latter. As another possibility, rather than the computer 11 addressing messages to a specific address associated with the adaptor 49, an arrangement could be used in which the adaptor 52 sends messages intended for portable 10 to a fixed address that is recognised by adaptor 49 in addition to its own address, messages so addressed being blocked from transmission out onto the network 69.

The protocols used to communicate the computer 11 with the computer 10 and with the network 11 will generally be different. Thus the link between the computers 10 and 11 may utilise the ANSI Fibre Channel Protocol and, as already indicated, the network protocols used may be those of the 10BaseT standard, though other network protocols are also suitable. However, in appropriate circumstances, it would be possible to use the same network protocols both for the link between the computers 10 and 11 and for the network 69 itself; in this special case the adaptors 47 and 48 could be omitted. It may also be noted that even in the more general case when adaptors 48 and 49 are present, it will usually be possible to integrate their design to optimise performance so that there may well not exist a clear boundary between these two elements.

A further feature of the desktop computer 11 of FIG. 5 is that the communications interface unit 50 is arranged to be powered from a standby power supply 77 when the computer 11 has been turned off by the user; this permits the portable computer 10 to communicate with the network 69 even when the computer 11 is turned off. More particularly, the computer 11 includes a power provisioning system 75 comprising a main power supply 76 and a standby power supply 77 both intended to run off an external power source 78. The power provisioning system 75 further comprises a power-state control unit 79 having first, second and third states. The unit 79 resides in its first state when the computer 11 is disconnected from the external power source 78; in this first state, neither supply 76 or 77 is energised and all circuits of the computer are inactive (in fact, an internal power source is used to maintain certain key circuits, including the unit 79 and, generally, a real time clock). When the external power source 78 is connected, the control unit will reside in either its second or its third state. In the second state of the unit 79, only the standby supply 77 provides an output at 81 and this output is used to power the communications interface 50; in this second state the computer 10 can therefore communicate with network 69 through the communications interface 50 without the main circuits of the computer 11 being powered up. In the third state of the unit 79, the main supply 77 provides an output at 80 that powers all the circuits of the computer enabling the computer 10 to communicate with the main processing circuits of computer 11 as well as with network 69. A user-operable front panel switch 85 serves to toggle the power-state control unit 79 between its second and third states as commanded by the user (software activated turnoff is also feasible). The unit 79 automatically transits to its first state when the external power source 78 is disconnected. On reconnection of the power source 78, the unit 79 may be arranged always to come up in its second state; alternatively, the unit 79 can be provided with a memory holding its state (second or third state) at the moment of disconnection of the power source 78 and, in this case, on reconnection the unit 79 can be placed in this memorised state.

The control unit 79 may also be moved from its second (standby) state to its third (on) state by receipt of a special predetermined packet by the adapter 52 over the network 69 or from the portable computer 10. Thus, plugging in the portable computer 10 to the computer 11 using cable 30 and sending the predetermined packet from computer 10 to computer 11, can be arranged to wake up the computer 11 from its second standby state to its third, on, state; upon cessation of communication between the computers (as, for example, determined by inactivity for a given period), the control unit 79 can be arranged to transit back to its second state.

Figure 6:
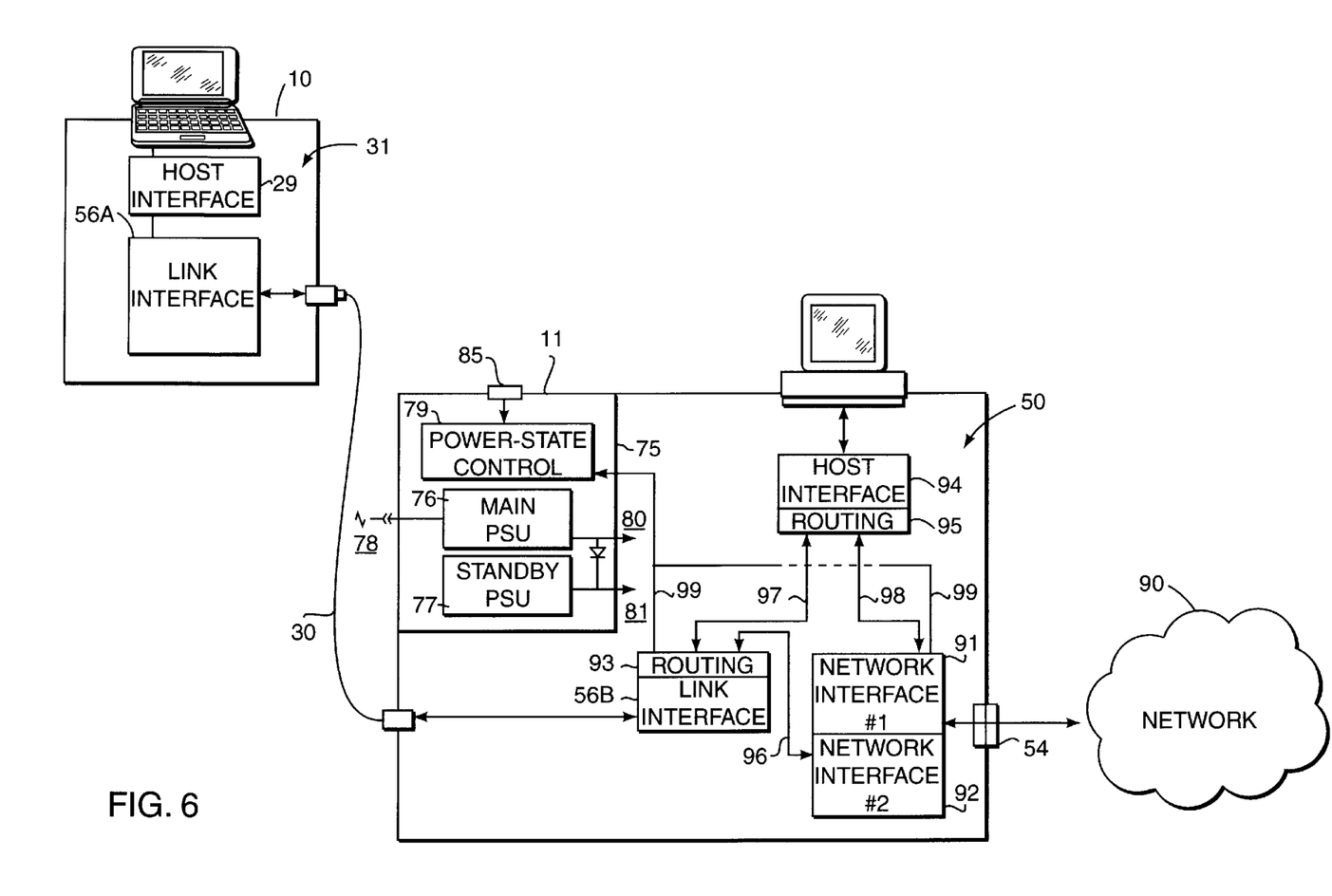
FIG. 6 is a diagram of a second embodiment of the invention.

A second embodiment of the invention is shown in FIG. 6, this embodiment being similar to that of FIG. 5 but differing in respect of certain of the details of communications interface 50 of computer 11. In addition, the network 90 to which the computer 11 is connected through connector 54 has been generalised to be any network type. As regards the link adaptor 32 and MAU 33 of computer 10 in FIG. 5, these have been combined in FIG. 6 into a link interface block 56A; similarly, link adaptor 48 and MAU 47 have been combined into link interface 56B.

The communications interface 50 of the FIG. 6 embodiment includes two network interfaces 91, 92 providing separately-addressable ports onto network 90. The network interface arrangement illustrated in FIG. 6 is not intended to call for any particular architecture and covers, for example, the FIG. 5 configuration where network adaptors 52 and 49 provide two addressable network ports that are united through repeater 41; other configurations are also possible such as an internal network bus segment to which interfaces 91 and 92 are separately connected.

A feature of the FIG. 5 embodiment is that communication between the computers 10 and 11 uses the network interface of computer 11 so that, except in the special arrangement mentioned where the repeater 51 or MAU 53 blocks the transmission onto network 69 of traffic between computers 10 and 11, this traffic will be sent out over the network which may be undesirable from the point of view both of network loading and security. In the FIG. 6 embodiment, this situation is avoided by providing separate paths in communications interface 50 for network messages and messages flowing between computers 10 and 11. More particularly, link interface 56B is provided with routing functionality (block 93) that recognises whether a message coming from computer 10 is intended for the main processing circuits of computer 11 or for transmission over the network 90; in the the former case the message is passed over path 97 to host interface 94 whereas in the latter case the message is passed over path 96 to network interface 92. The host interface 94 also includes routing functionality (block 95) for recognising whether a message coming from the main processing circuits of computer 11 is intended for computer 10 or for transmission over the network 90; in the the former case the message is passed over path 97 to the link interface 56B whereas in the latter case the message is passed over path 98 to network interface 91. It will be appreciated that the paths 96, 97 and 98 are logical paths and not necessarily physical paths. It will also be appreciated that blocks 93 and 95 include arbitration functionality for handling the situation where messages are simultaneously available from more than one source.

It may be noted that messages passing between the computer 10 and network 90 (in either direction) undergo a protocol translation in passing through the interfaces 56B and 92 to adapt the messages to the protocols being used over link 30 and network 90 respectively. This protocol translation can, of course, be effected by passing each message up the protocol stack of one interface and then down the protocol stack of the other interface; however, if the interface 56B is arranged to recognise at a low level messages intended for the network 90, then a more direct protocol translation can be effected between interfaces 56B and 92. It would, of course, still be necessary to pass messages exchanged between the computer 10 and the host interface 94 through the full protocol stack run by interface 56B.

Whilst the host interface 94 has been described as providing a single access point to the main processing circuits of the computer 11, it would also be possible for interface 94 to provide separate access points (for example, host bus interfaces) for connecting paths 97 and 98 to the main processing circuits. In this case, routing block 95 would not be required as the main processing circuits would route messages to the appropriate access point.

The FIG. 6 embodiment includes the same power provisioning system 75 as the FIG. 5 embodiment except that now transitioning the system from its second state (standby supply energised) to its third state (main supply energised), is effected when either the block 93 associated with the link interface 56B or the network interface 91 recognises a special wake-up message destined for the computer 11. Upon recognition of such a message, a wake-up signal is passed over line 99 to the power-state control block 75. It may be noted that when the power-provisioning system is in its second state, only the blocks 56B, 91, 92 and 93 need be energised from the standby supply.

Figure 7:
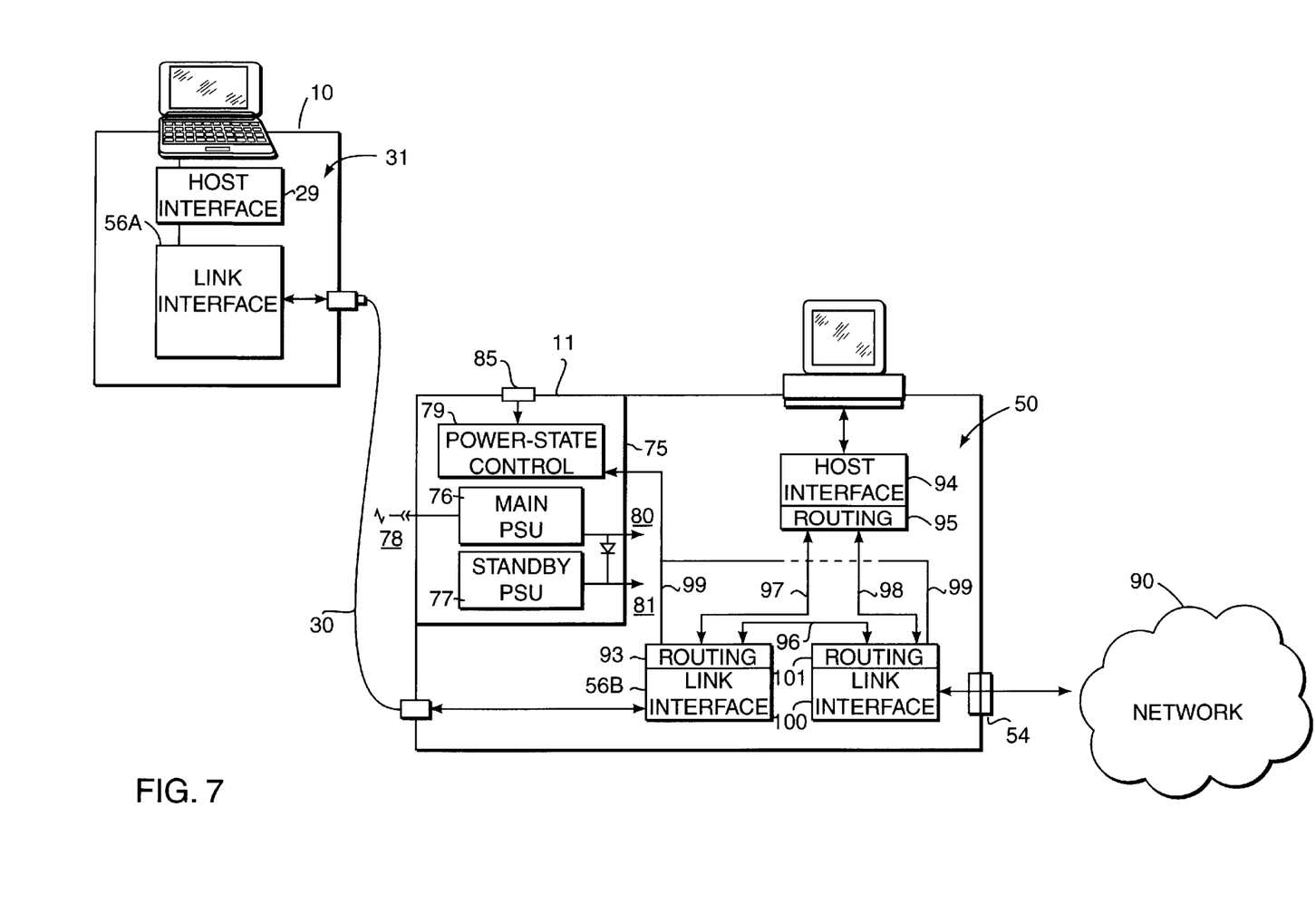
FIG. 7 is a diagram of a third embodiment of the invention.

FIG. 7 shows a third embodiment of the present invention which is similar to the FIG. 6 embodiment except that now the communications interface 50 of computer 11 is provided with only one network interface 100 which is used by both the main processing circuits of computer 11 and by computer 10 to connect with network 90. In this case, the network interface 100 is also provided with routing functionality (block 101) for recognising whether a message received over network 90 is intended for the main processing circuits of computer 11 or for computer 10. This recognition may be based on the inclusion in the message of an appropriate indicator (such as subsystem number) but can be most conveniently done by having the network interface respond to two separate network addresses, one associated with the main processing circuits of computer 11 and the other with the path to computer 10—in this case, the message address indicates to block 101 the correct routing.

It will be appreciated that the embodiments of FIGS. 5, 6 and 7 are simply illustrative of the present invention and many variants are possible. Thus the communications interface 31 of the portable computer 10 may be implemented in an externally-accessible plug-in module, such as a PCMCIA module, the computer 10 including a corresponding slot into which the module engages.

As regards the cable 30, although both ends have been described as having pluggable connectors, one end may be permanently connected. For example, where the communications interface 31 is implemented as a plug-in module, the cable 30 could be permanently connected to the module. Alternatively, the desktop-computer end of the cable 30 could be permanently connected and the desktop computer 11 could be provided with a cable store from which the free end of the cable could be withdrawn. The cable store may be of reel form or linear. Of course, the cable store could be provided in the portable computer instead.

As already indicated, the network to which computer 11 is connected can be of any appropriate type with the or each network interface being provided with a MAU suitable for the transmission medium concerned. Thus with reference to the FIG. 5 embodiment, the MAU 53 could be of the same form as MAU 56 and interface with a duplex fibre-optic cable similar to cable 30. Where other DTEs are provided with similar communication interfaces 50, a daisy-chain network similar to FIG. 4 can be built up but using duplex fiber-optic cables instead of dual UTP cables. A network of this form has the advantage that crossover problems do not occur; in addition, the basic transmission medium is capable of supporting very high data transfer rates. A further advantage is that if each DTE has the same power provisioning arrangement as computer 11, then provided each DTE remains connected to the external power source 78, the network will remain available regardless of how many DTE's are switched off and without the need for bypass relays.

Although in the described embodiments the portable computer 10 connects only to the computer 11, it would be possible to provide for connection to other devices and to this end the communications interface 31 could take the same form as the communications interface 50 of computer 11 but preferably with the same communication protocol running on each connection.

Furthermore, whilst the 2:1 couplers 36, 59 shown in FIG. 5 are depicted as guided wave devices, it will be appreciated that bulk optic devices can also be used, the basic functional requirement being for a coupler having receive and transmit ports that are optically coupled to a bidirectional port. It will also be appreciated that reference to optical devices refers to devices for handling those wavelengths used in optical communications, whether or not in the visible spectrum.

Although the communication interfaces 31 and 50 have been illustrated as distinct subsystems of the computers 10 and 11, it will be appreciated that physically they may be implemented on the motherboards of these computers with their circuitry integrated into chips including other circuitry of the computer.

As well as facilitating the connection to portable computers, the present invention can also be used to facilitate connection to other portable electronic data-handling equipment such as PDAs (Personal Digital Assistants); thus the present invention can be used to connect a PDA to a desktop computer or, indeed, to a portable computer. It will be appreciated that the term "desktop" computer as used herein is to be interpreted broadly as including tower computer arrangements as well as computers actually intended to sit on a desktop.

We claim:

1. A communication system comprising a portable electronic apparatus provided with a first communications interface for providing a local area network connection, and a desktop computer provided with a second communications interface for providing a local area network connection, each said communications interface comprising:

a host interface for interfacing the communications interface with main processing functionality of the apparatus/computer concerned;

a link interface including:
      a media attachment unit including an optical transmitter, an optical receiver, and an optical coupler, the optical coupler having a transmit port interfacing with the optical transmitter, a receive port interfacing with the optical receiver, and a bidirectional port optically coupled to both the transmit and receive ports, and
      an optical connector for connecting a duplex fiber-optic cable to said bidirectional port of the coupler; and an interconnection for operatively interconnecting said host interface and said link interface;

wherein said interconnection of the second communications interface is operative to permit the portable computer to communicate through the link interface of said second communications interface selectively with:

said main processing functionality of the desktop computer through said host interface of said second communications interface, and said computer network through said network interface of said second communications interface;

the system further including a said duplex fiber-optic cable connected between said optical connector of the said portable electronic apparatus and said optical connector of said desktop computer with the connection between the fiber-optic cable and at least one of said optical connectors being releasable.

2. A system according to claim 1, wherein each said optical connector is an externally-accessible pluggable optical connector for releasably engaging with said duplex fiber-optic cable.

3. A system according to claim 1, wherein said desktop computer has a power provisioning system for powering the computer from an external power source, the power provisioning system having first and second states and comprising:

a user-operable power state control for transitioning the power provisioning system in both directions between said first and second states, a wake-up facility responsive to the receipt by said second communications interface of a predetermined signal from said portable electronic apparatus, to transition the power provisioning system from its second state to its first state, a main power supply for energizing the desktop computer when said power provisioning system is in its said first state and is connected to said external power source, and a standby power supply for energising said second communications interface when the power provisioning system is in its second state and is connected to said external power source.

4. A system according to claim 1, wherein said interconnection of the second communications interface passes all communications with said link interface of the second communications interface through said network interface, said network interface comprising:

a first network adaptor connected to said host interface,
   a second network adaptor connected to said link interface,
   a network media attachment unit for providing connection to said computer network, and
   a multiport repeater having at least three ports, a first said port being connected to said first network adaptor, a second said port being connected to said second network adaptor, and a third said port being connected to said network media attachment unit;

said first and second network adaptors being operative to send and receive addressed messages whereby said interconnection of the second communications interface is implemented by the appropriate addressing of messages by said adaptors.

5. A system according to claim 1, wherein said interconnection of the second communications interface provides both a first path between said link interface and said host interface and a separate second path between said link interface and said host interface.

6. A system according to claim 1, wherein said link interfaces of said first and second communications interfaces inter-operate according to a first protocol, and said network interface of the second communications interface operates according to a second protocol different from said first protocol, said interconnection of the second communications interface providing for translation between said protocols at least for communications effected from said portable computer to said computer network.

7. A desktop computer for use in a communications system according to claim 1, a network interface of the desktop computer comprising:

a media attachment unit including an optical transmitter, an optical receiver, and an optical coupler, the optical coupler having a transmit port interfacing with the optical transmitter, a receive port interfacing with the optical receiver, and a bidirectional port optically coupled to both the transmit and receive ports, and an optical connector for connecting a duplex fiber-optic cable to said bidirectional port of the coupler of the network interface.

8. A system according to claim 1, wherein said desktop computer has a power provisioning system for powering the computer from an external power source, the power provisioning system having first and second states and comprising:

a user-operable power state control for transitioning the power provisioning system between said first and second states, a main power supply for energising the desktop computer when said power provisioning system is in its said first state and is connected to said external power source, and a standby power supply for energising at least the said link interface, interconnection and network interface of said second communications interface when the power provisioning system is in its said second state and is connected to said external power source.

9. A plug-in module for enabling electronic apparatus to be used in a communications system as claimed in claim 1, said module comprising:

a host interface for interfacing the module with said electronic apparatus;

a link interface including:
  a media attachment unit including an optical transmitter, an optical receiver, and a optical coupler, the optical coupler having a transmit port interfacing with the optical transmitter, a receive port interfacing with the optical receiver, and a bidirectional port optically coupled to both the transmit and receive ports, and
  an optical connector for connecting a duplex fiber-optic cable to said bidirectional port of the coupler; and an interconnection for operatively interconnecting said host interface and said link interface.

10. A module according to claim 9, wherein said optical connector is an externally-accessible optical connector for repeatable releasable engagement by a novice user with said duplex fiber-optic cable.

11. A module according to claim 9, including said duplex fiber-optic cable; said cable having a first end connected to said bidirectional port of the optical coupler by said optical connector, and a second end provided with a pluggable optical connector.

12. Portable electronic apparatus provided with a communications interface housed within the electronic apparatus for providing a local area network connection and comprising:

a host interface for interfacing the communications interface with main processing functionality of the portable electronic apparatus;

a link interface including:
  a network interface for interfacing the portable electronic apparatus with a computer network;
  a media attachment unit including an optical transmitter, an optical receiver, and an optical coupler, the optical coupler having a transmit port interfacing with the optical transmitter, a receive port interfacing with the optical receiver, and a bidirectional port optically coupled to both the transmit and receive ports, and
  an optical connector for connecting a duplex fiber-optic cable to said bidirectional port of the coupler; and an interconnection for operatively interconnecting said host interface and said link interface, said interconnection being operative to permit a computer connected to said internal communications interface via a said duplex fiber-optic cable to communicate through the link interface selectively with:
  said main processing functionality of the portable electronic apparatus through said host interface, and
  said computer network through said network interface.

13. Portable electronic apparatus according to claim 12, wherein said optical connector is an externally-accessible pluggable optical connector for repeatable releasable engagement by a novice user with said duplex fiber-optic cable.

14. Portable electronic apparatus according to claim 12, including said duplex fiber-optic cable; said duplex fiber-optic cable having a first end connected to said bidirectional port of the optical coupler by said optical connector, and a second end provided with a pluggable optical connector.

15. Portable electronic apparatus according to claim 14, including an internal cable store from which said cable can be drawn out for connection to other apparatus.

16. Portable electronic apparatus according to claim 10, wherein said electronic apparatus is provided with an externally-accessible slot for a plug-in module, said communications interface being provided on a plug-in module engaged in said slot.

17. Portable electronic apparatus according to claim 13, wherein said electronic apparatus is provided with an externally-accessible slot for a plug-in module, said communications interface being provided on a plug-in module engaged in said slot.

18. Portable electronic apparatus according to claim 14, wherein said electronic apparatus is provided with an externally-accessible slot for a plug-in module, said communications interface being provided on a plug-in module engaged in said slot.

19. Portable electronic apparatus according to claim 15, wherein said electronic apparatus is provided with an externally-accessible slot for a plug-in module, said communications interface being provided on a plug-in module engaged in said slot.

20. A desktop computer comprising:

an internal communications interface, said internal communications interface housed within the computer and including:
  a host interface for interfacing the internal communications interface with main processing functionality of said desktop computer;
  a link interface including:
    a network interface for interfacing the desktop computer with a computer network;
    a media attachment unit including an optical transmitter, an optical receiver, and an optical coupler, the optical coupler having a transmit port interfacing with the optical transmitter, a receive port interfacing with the optical receiver, and a bidirectional port optically coupled to both the transmit and receive ports, and an optical connector for connecting a duplex fiber-optic cable to said bidirectional port of the coupler; and
  an interconnection for operatively interconnecting said host interface and said link interface, said interconnection being operative to permit a portable computer connected to said internal communications interface via a said duplex fiber-optic cable to communicate through the link interface selectively with:
    said main processing functionality of the desktop computer through said host interface, and
    said computer network through said network interface.

21. A desktop computer according to claim 20, wherein said optical connector is an externally-accessible pluggable optical connector for repeatably and releasably engaging with said duplex fiber-optic cable.

22. A desktop computer according to claim 20, including said duplex fiber-optic cable having a first end connected to said bidirectional port of the optical coupler by said optical connector, and a second end provided with an optical connector which is pluggable and unpluggable by users.

23. A desktop computer according to claim 22, including an internal cable store from which said cable can be drawn out for connection to other apparatus.

24. A desktop computer according to claim 20, further comprising a power provisioning system for powering the computer from an external power source, the power provisioning system having first and second states and comprising:

- a user-operable power state control for transitioning the power provisioning system in both directions between said first and second states,
- a wake-up facility responsive to receipt by said communications interface of a predetermined signal over said duplex fiber-optic cable, to transition the power provisioning system from its second state to its first state,
- a main power supply for energising the desktop computer when said power provisioning system is in its said first state and is connected to said external power source, and
- a standby power supply for energising said communications interface when the power provisioning system is in its said second state and is connected to said external power source.

25. A desktop computer according to claim 20, wherein said interconnection of said internal communications interface passes all communications with said link interface through said network interface, said network interface comprising:

- a first network adaptor connected to said host interface,
- a second network adaptor connected to said link interface,
- a network media attachment unit for providing connection to said computer network, and
- a multiport repeater having at least three ports, a first said port being connected to said first network adaptor, a second said port being connected to said second network adaptor, and a third said port being connected to said network media attachment unit;

said first and second network adaptors being operative to send and receive addressed messages whereby said interconnection of said internal communications interface is implemented through said computer network by the appropriate addressing of messages by said adaptors.

26. A desktop computer according to claim 20, wherein said interconnection of said internal communications interface provides both a first path between said link interface and said host interface and a separate second path between said link interface and said host interface.

27. A desktop computer according to claim 20, wherein said link interface operates according to a first protocol, and said network interface operates according to a second protocol different from said first protocol, said interconnection of said internal communications interface providing for translation between said protocols for communications passing between said link interface and said network interface.

28. A desktop computer according to claim 20, further comprising a power provisioning system for powering the computer from an external power source, the power provisioning system having first and second states and comprising:

- a user-operable power state control for transitioning the power provisioning system between said first and second states,
- a main power supply for energising the desktop computer when said power provisioning system is in its said first state and is connected to said external power source, and
- a standby power supply for energising at least the said link interface,
- interconnection and network interface when the power provisioning system is in its said second state and is connected to said external power source.

* * * * *